H. WOTTLE.
APPARATUS FOR MANUFACTURING RIMS FOR WOODEN BELT PULLEYS.
APPLICATION FILED JUNE 8, 1911.
1,062,135.
Patented May 20, 1913.
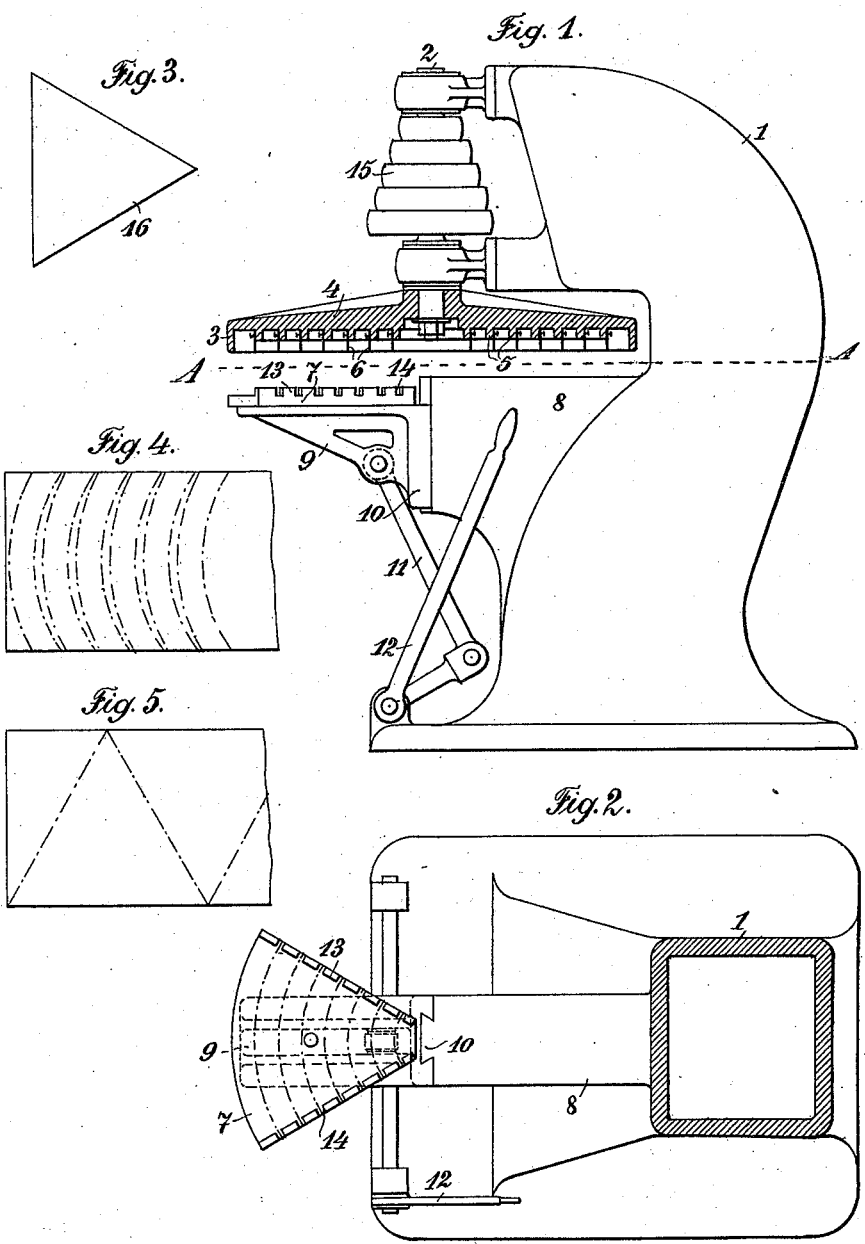

UNITED STATES PATENT OFFICE.

HANS WOTTLE, OF VIENNA, AUSTRIA-HUNGARY.

APPARATUS FOR MANUFACTURING RIMS FOR WOODEN BELT-PULLEYS.

1,062,135. Specification of Letters Patent. Patented May 20, 1913.

Application filed June 8, 1911. Serial No. 632,004.

*To all whom it may concern:*

Be it known that I, HANS WOTTLE, manufacturer, subject of the Emperor of Austria-Hungary, residing at 66 Embelgasse, Vienna V, Austria-Hungary, have invented certain new and useful Improvements in Apparatus for Manufacturing Rims for Wooden Belt-Pulleys, of which the following is a specification, reference being had therein to the accompanying drawing.

This invention relates to apparatus for the manufacture of rims for wooden belt pulleys the object being that in the manufacture the waste of material is reduced to the minimum, a large output is obtained and the resultant products are perfectly uniform and well made so that the finishing operations that pulleys formed with these rims require are confined to smoothing and varnishing and in assembling the pulleys, neither the rims nor the pulleys themselves require any further finishing. The method of producing these rims has hitherto been as follows: Their form is traced singly upon a planed board by means of a pattern or templet as shown in Figure 4 after which they are cut out to the traced form by a band saw. This method of manufacture not only necessitates the expenditure of a large amount of time and labor but also entails a considerable waste of material while the segments are somewhat irregular or inaccurate and therefore require a large amount of finishing.

All these defects are obviated by the present invention which contemplates planing the boards employed in the manufacture to a uniform thickness as hitherto and (as shown in Fig. 5) cutting same into triangular pieces, the magnitude of the angles being an exact divisor of a full angle of 360° amounting for example to 90°, 60°, 45°, 30° and so forth whereupon these pieces of wood are cut in one operation by a number of concentrically arranged saw blades (this number corresponding to the width of the board) into rims with different radii, as shown in Fig. 2. It will be obvious that the rims thus formed with the same radii are perfectly uniform and exactly and cleanly formed so that no finishing operation is necessary other than smoothing and varnishing. Furthermore, the manufacture of a pulley by this method occupies only a small fraction of the time required for a pulley formed from rims cut with band saws.

A machine for carrying the aforesaid improved method into practice is illustrated by way of example in the accompanying drawing in which:—

Fig. 1 shows the machine in side elevation and partial section. Fig. 2 is a horizontal section on the line A—A in Fig. 1. Fig. 3 is a plan view of a triangular block ready for sawing. Figs. 4 and 5 show sections of wood marked for sawing.

The machine consists of a stand or framework 1 carrying a vertical shaft 2 at the lower end of which a plate 4 provided with a flange 3 is mounted. On its under side the plate 4 comprises a number of circular concentrically arranged ribs 5 to which the saw blades 6 are appropriately fixed. Beneath these saws the work table 7 is arranged; this table stands out from a bracket or projection 8 of the frame and extends as far as the center of the plate and terminates at the periphery of the same. The work table is interchangeably mounted on a carriage 9 vertically movable in a prismatic guide 10 in the frame or stand; it can be raised and lowered by a handle 12 by means of a bent lever 11 mounted on the stand and connected with the carriage. The work table comprises two lateral ledges 13 which converge at a given angle which is an exact divisor of 360°, toward the center of the pulley. The ledges are formed with recesses 14 which enable the saws to pass through them. The saw plates are interchangeable so that by fitting a smaller or a larger plate segments of smaller or larger radius can be formed as requirements dictate. According as circular segments of 90°, 60°, 45°, 30°, and so forth are to be cut a corresponding table 7 is fitted whereupon suitable pieces of wood (Fig. 3) are inserted between the ledges in one or more layers. When the machine has been started the table is brought against the rotating plate by pulling forward the lever 12 and the pieces of wood are cut in one operation into a number of rims. By pressing the lever 12 back the table is separated from the rotating plate so that the segments can be removed. When the necessary number of these segments are assembled they furnish a number of rims of various diameters.

The shaft 2 is provided with a stepped cone pulley 15 for driving the plate at different speeds.

What I claim and desire to secure by Letters Patent of the United States is:—

1. An apparatus for manufacturing rims for wooden belt pulleys comprising in combination a rotating plate, a series of circular concentrically arranged saws fitted to said plate, a work-table extending substantially from the center of said plate to its periphery, sets of stops or ledges on said work-table which converge toward substantially the center of said plate and inclose an angle which is a factor of 360°, spaces between said stops or ledges for allowing said saws to pass freely in their circular movement when cutting the triangular blanks between said stops or ledges, and means for actuating the work-table to bring same into operative position relatively to said saws.

2. An apparatus for manufacturing rims for belt pulleys comprising a frame, a rotatable plate thereon, a series of circular concentrically arranged saws fitted to said plate, a work-table extending substantially from the center of said plate to its periphery, sets of stops or ledges on said work-table which converge toward substantially the center of said plate and inclose an angle which is a factor of 360°, spaces between said stops or ledges for allowing said saws to pass freely in their circular movement when cutting the triangular blanks held between said stops or ledges, a bent lever mounted on said frame, and connected to said table and a hand lever actuating said bent lever to move said table.

In testimony whereof I affix my signature in the presence of two witnesses.

HANS WOTTLE.

Witnesses:
ADA MARIA BERGER,
AUGUST FUGGER.

---

Copies of this patent may be obtained for five cents each, by addressing the "Commissioner of Patents, Washington, D. C."